United States Patent
Forsberg

(10) Patent No.: US 8,027,304 B2
(45) Date of Patent: Sep. 27, 2011

(54) SECURE SESSION KEYS CONTEXT

(75) Inventor: Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 773 days.

(21) Appl. No.: 11/483,403

(22) Filed: Jul. 6, 2006

(65) Prior Publication Data

US 2007/0060127 A1 Mar. 15, 2007

Related U.S. Application Data

(60) Provisional application No. 60/697,270, filed on Jul. 6, 2005.

(51) Int. Cl.
*H04K 1/00* (2006.01)
*H04M 1/66* (2006.01)
*H04W 4/00* (2009.01)

(52) U.S. Cl. ......... 370/331; 455/410; 455/436; 380/272

(58) Field of Classification Search .................. 455/410, 455/436, 411; 370/328–331; 380/270–273
See application file for complete search history.

(56) References Cited

U.S. PATENT DOCUMENTS

| | | | |
|---|---|---|---|
| 5,724,346 A | 3/1998 | Kobayashi et al. | |
| 6,587,680 B1 * | 7/2003 | Ala-Laurila et al. | 455/411 |
| 6,817,134 B2 | 11/2004 | Newman | |
| 7,103,359 B1 * | 9/2006 | Heinonen et al. | 455/436 |
| 7,107,620 B2 * | 9/2006 | Haverinen et al. | 726/29 |
| 7,158,777 B2 * | 1/2007 | Lee et al. | 455/411 |
| 7,233,664 B2 * | 6/2007 | Soliman | 380/44 |
| 7,263,357 B2 * | 8/2007 | Lee et al. | 455/432.1 |
| 7,272,381 B2 * | 9/2007 | Aura | 455/410 |
| 7,395,427 B2 * | 7/2008 | Walker | 713/169 |
| 7,486,651 B2 * | 2/2009 | Hagiwara et al. | 370/338 |
| 7,493,652 B2 * | 2/2009 | Aura | 726/2 |
| 7,535,870 B2 * | 5/2009 | Nikander et al. | 370/331 |
| 2003/0214922 A1 * | 11/2003 | Shahrier | 370/331 |
| 2004/0049676 A1 * | 3/2004 | Dutertre et al. | 713/163 |
| 2004/0077335 A1 | 4/2004 | Lee et al. | |
| 2004/0102181 A1 | 5/2004 | Horn | |
| 2004/0103282 A1 * | 5/2004 | Meier et al. | 713/171 |

(Continued)

FOREIGN PATENT DOCUMENTS

CN 1501746 6/2004

(Continued)

OTHER PUBLICATIONS

"AAA Architecture for Mobile IP in Overlay Networks," in The IEEE Conference on Local Computer Networks, 2005, 30th Anniversary, (LCN' 05), Sydney, Australia Nov. 15-17, 2005, pp. 772-775.

(Continued)

*Primary Examiner* — Lester Kincaid
*Assistant Examiner* — Steven Kelley

(57) ABSTRACT

Handoffs must be fast for wireless mobile nodes without sacrificing the security between a mobile node and wireless access points in an access network. A secure session keys context approach is shown having all the good features, like mobility and security optimization, of the currently existing proposals of key-request, pre-authentication, and pre-distribution but also providing improved scalability for the access network and for the mobile node. The new approach is compared to the existing proposals including memory requirements and especially how to reduce memory usage using a "just-in-time" transfer of security information between access points and a mobile node during a handover.

17 Claims, 11 Drawing Sheets

U.S. PATENT DOCUMENTS

| | | | |
|---|---|---|---|
| 2004/0203781 A1 | 10/2004 | Lefkowitz | |
| 2004/0225534 A1 | 11/2004 | Zheng | |
| 2004/0240412 A1 | 12/2004 | Winget | |
| 2004/0242228 A1* | 12/2004 | Lee et al. | 455/432.1 |
| 2004/0260937 A1 | 12/2004 | Narayanan | |
| 2005/0044365 A1* | 2/2005 | Haukka et al. | 713/171 |
| 2005/0059396 A1* | 3/2005 | Chuah et al. | 455/435.1 |
| 2005/0144321 A1 | 6/2005 | Forsberg | |
| 2005/0163078 A1 | 7/2005 | Oba et al. | |
| 2005/0235065 A1 | 10/2005 | Le et al. | |
| 2005/0282548 A1* | 12/2005 | Kim et al. | 455/436 |
| 2005/0286471 A1 | 12/2005 | Yang et al. | |
| 2006/0002345 A1 | 1/2006 | Lapraye | |
| 2006/0013398 A1* | 1/2006 | Halasz et al. | 380/273 |
| 2006/0030326 A1 | 2/2006 | O'Neill et al. | |
| 2006/0067526 A1* | 3/2006 | Faccin et al. | 380/46 |
| 2006/0069926 A1 | 3/2006 | Ginter et al. | |
| 2006/0083200 A1* | 4/2006 | Emeott et al. | 370/331 |
| 2006/0101273 A1 | 5/2006 | Tan et al. | |
| 2006/0274695 A1* | 12/2006 | Krishnamurthi et al. | 370/331 |
| 2006/0285519 A1* | 12/2006 | Narayanan et al. | 370/331 |

FOREIGN PATENT DOCUMENTS

| | | |
|---|---|---|
| CN | 1630404 | 6/2005 |
| EP | 1414262 | 4/2004 |
| WO | 0139538 | 5/2001 |
| WO | 2006/044251 | 4/2006 |

OTHER PUBLICATIONS

IETF RFC 2104, "HMAC: Keyed-Hashing for Message Authentication," Krawczyk et al., Feb. 1997.

IETF Draft, "Protocol for Carrying Authentication for Network Access (PANA)," Forsberg et al., Sep. 4, 2006.

IEEE Communications Society, "Protecting All Traffic Channels in Mobile IPv6 Network," Ying et al., 2004.

IEEE, "Scalable QoS Support Mobile Resource Reservation Protocol for Real-time Wireless Internet Traffic," Yasukawa et al, 2002.

IEEE, "Efficient End-to-End Authentication Protocols for Mobile Networks," Chang et al, 1996.

IEEE, "Group Key Management in Wireless Networks Using Session Keys," Damodaran et al, 2006.

IEEE, Self-healing in Group Key Distribution Using Subset Difference Method, Bohio et al, 2004.

IETF RFC 3374, "Problem Description: Reasons for Performing Context Transfers Between Nodes in an IP Access Network," Kempf, Sep. 2002.

Chinese Office Action dated Nov. 12, 2010 in corresponding Chinese Application No. 200680030226.X (6 pages) and English translation thereof (10 pages).

English Abstract of Chinese Publication No. 1630404, Yu Zonghui et al. (1 page).

Extended European Search Report dated Jul. 25, 2011 in parallel European Patent Application No. 06779839.7 (8 pages).

* cited by examiner

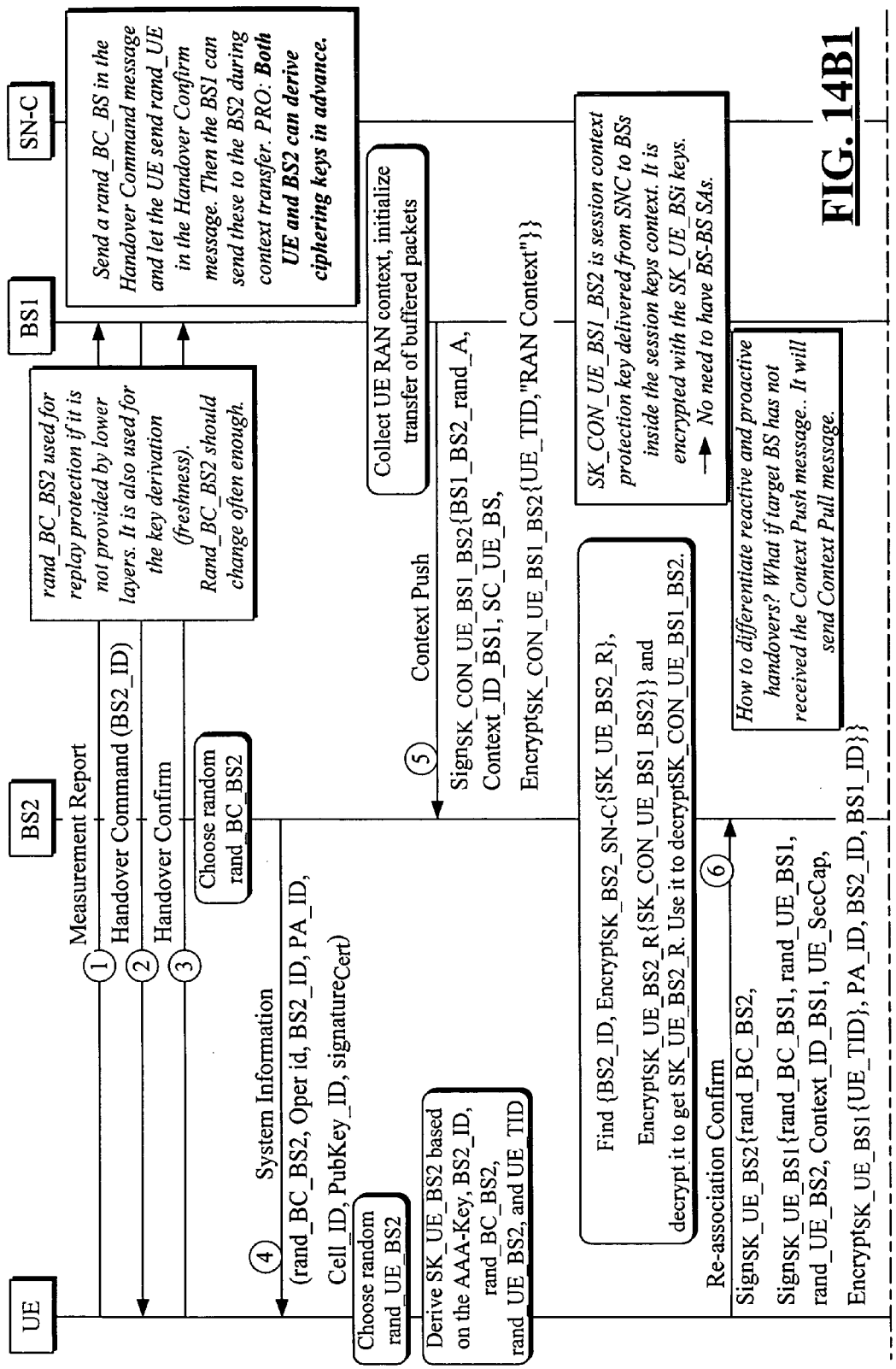
FIG. 14B1

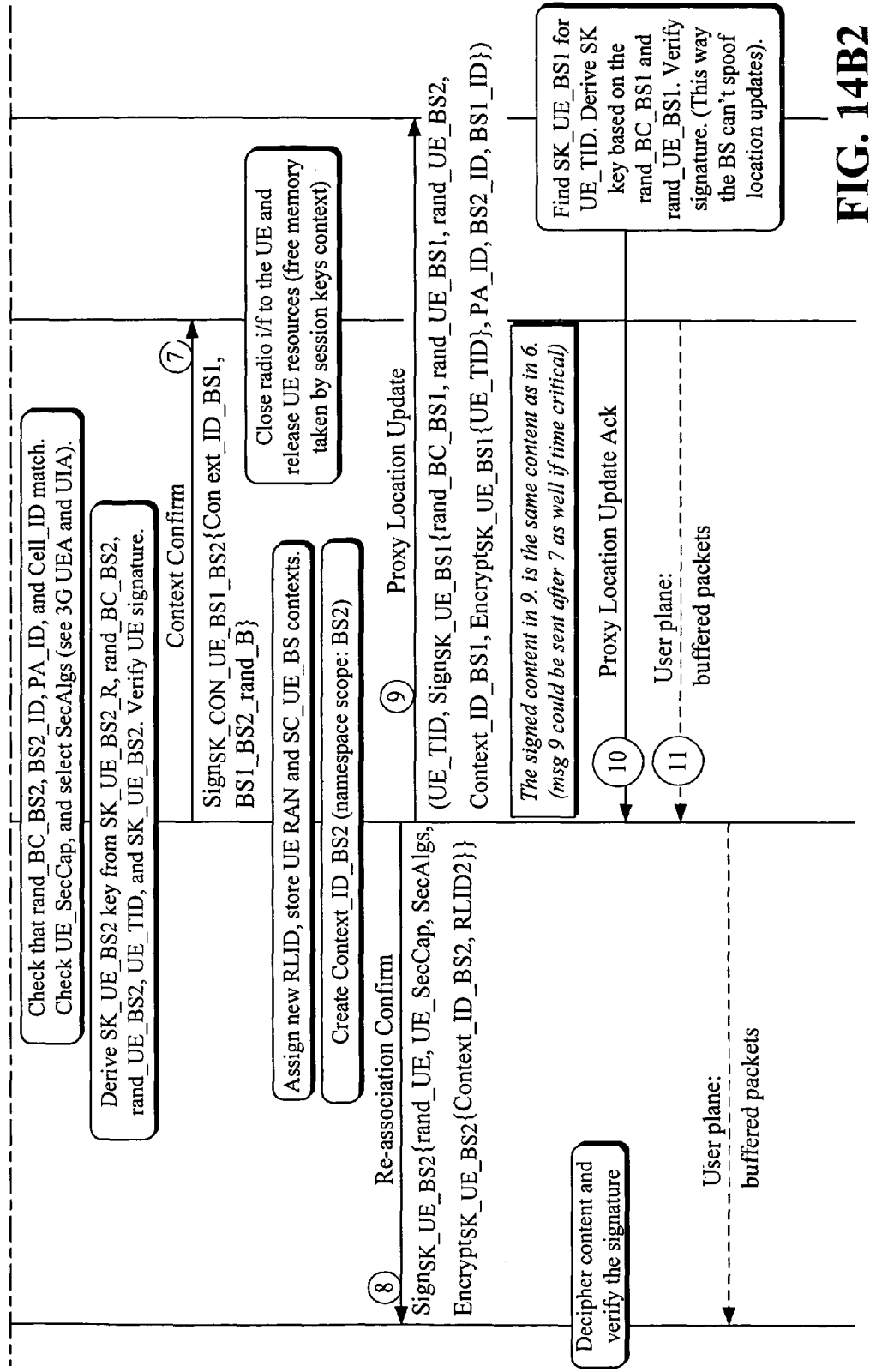
FIG. 14B2

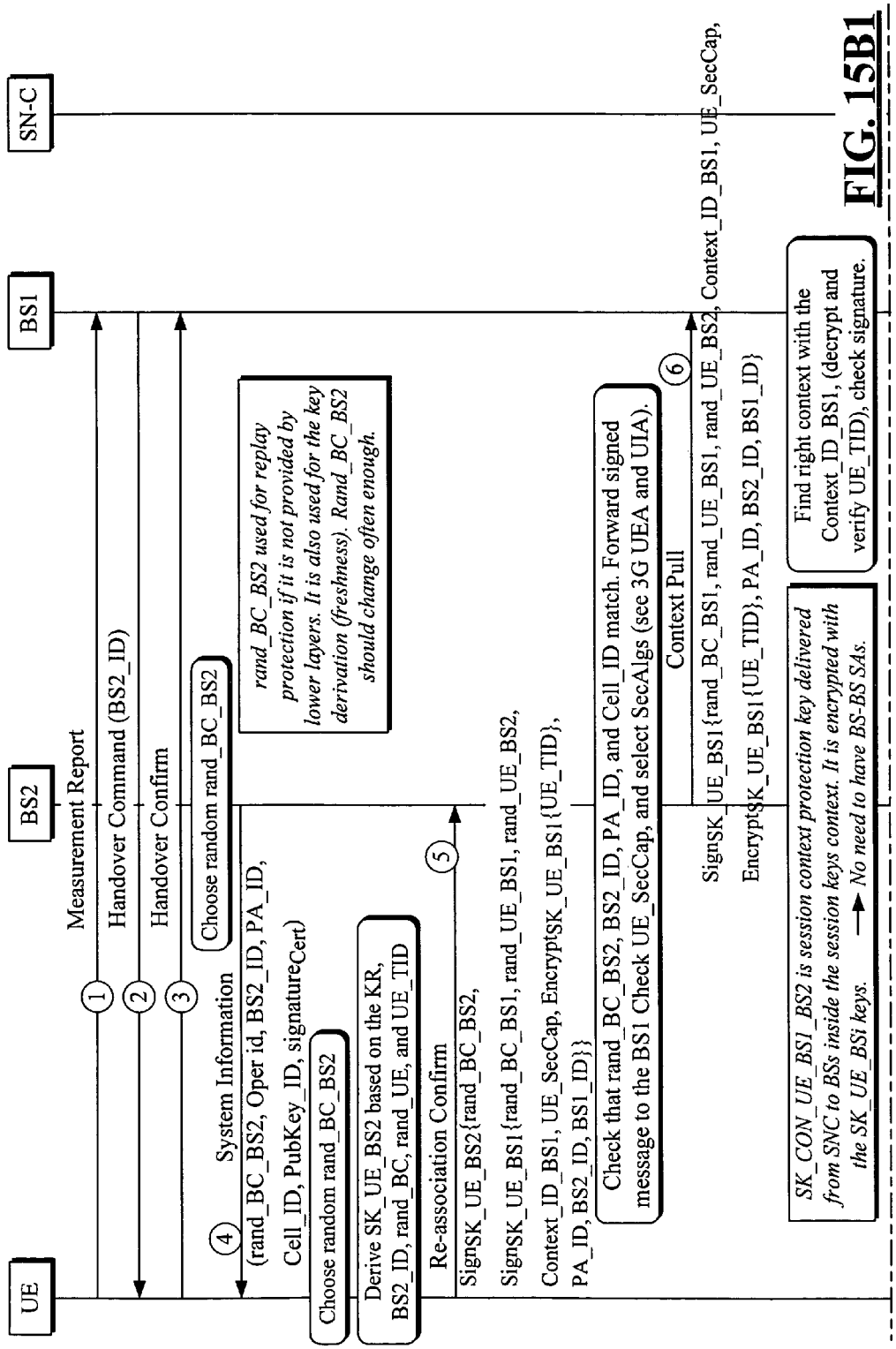
FIG. 15B1

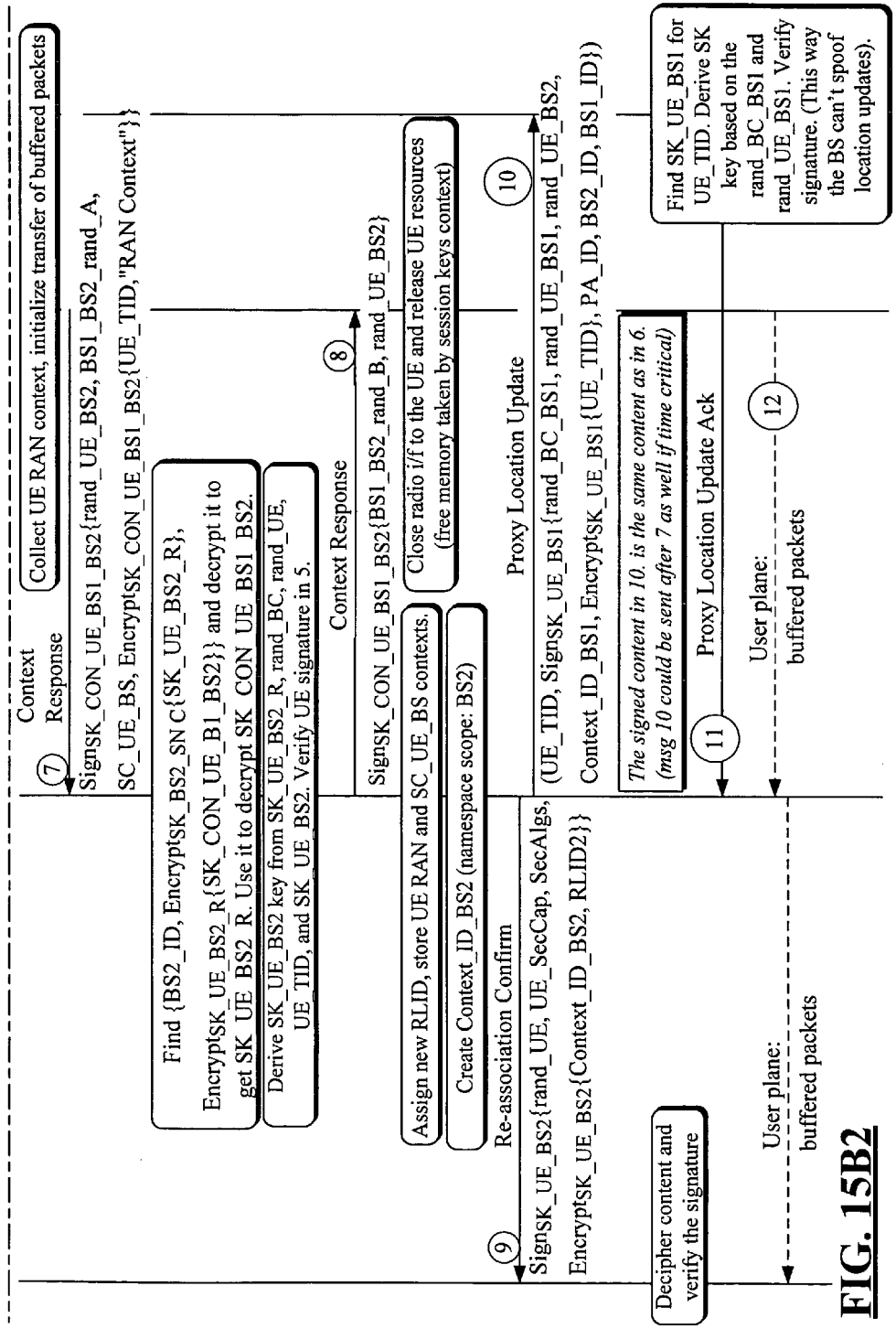
FIG. 15B2

SECURE SESSION KEYS CONTEXT

CROSS REFERENCE TO RELATED APPLICATION

This application claims priority from U.S. provisional application Ser. No. 60/697,270 filed Jul. 6, 2005.

BACKGROUND OF THE INVENTION

1. Technical Field

The present invention relates to secure wireless communications and, more particularly, to preserving security of a wireless communication during handover.

2. Discussion of Related Art

I. Introduction

Protected Session Keys (SK) management for mobile terminals attached to wireless access networks has become a hot research topic. The term "Session Keys" (SKs) refers to keys that are used to create ciphering keys between an Access Point (AP) and a Mobile Node (MN). This SK could also be named as an Authentication Key (AK). In IEEE groups such as 802.11(r,i)[17], 802.21, and 802.16 (WiMAX) are working with issues to improve support for mobile terminals without sacrificing the security of Mobile Node sessions. The so-called Extensible Authentication Protocol (EAP) working group in the IETF (RFC 3748) is working with key hierarchies and key derivation [2]. The IETF Protocol for carrying Authentication for Network Access (PANA) working group is tackling the issue of mobility optimizations for the PANA protocol [12], 13] and at a high-level is facing the same problem as the other groups. They have all encountered the security problem of using the same SKs with multiple APs. Thus, one of the key issues in the SK management area has been a requirement of having cryptographically separate SKs for every Access Point (AP) [1]. To achieve this, different proposals have emerged. Three existing proposals are analyzed, namely pre-distribution, key-request, and pre-authentication, and they are compared to the new approach of the invention.

The remainder of this background section describes the reference architecture, an analysis is provided of separate SKs used for APs in the context of a handoff process. The three existing proposals for separate session keys for APs are then described.

II. Separate Session Keys for Access Points

A. Reference Architecture

In this specification a simple reference architecture is focused upon, in which a centralized gateway (GW) is connected with multiple APs. This architecture is outlined in FIG. 1. All the APs have a wireless interface towards the wireless MN and a wired (or wireless) interface towards a centralized GW. APs forward packets between the MN and the GW and the wireless MN can be moving between the APs, leading to handoffs. The GW forwards packets to and from the MN to the Internet. The access network has multiple randomly attached MNs. One AP may handle multiple MNs simultaneously. APs under the control of the GW have direct connections via an Ethernet switch for example. Other connections are of course possible and this is but one example. In this specification it is assumed that the traffic protection happens between the MN and the AP, not for example between the MN and the GW. In this way the APs can filter traffic that is not properly authenticated and protect the GW from direct attacks. All SK establishment and distribution mechanisms described in this specification would not be needed if the MN uses the session with the GW to create ciphering keys between them. This would mean that the packets are encrypted and decrypted in the MN and the GW. Also, in such a case the rogue-AP security threat would not be critical because the AP would not be able to decrypt the traffic. On the other hand, integrity protection of the control plane signaling between the MN and the AP would have to be protected or moved from the AP to the GW.

When a wireless MN is changing its attachment point from one AP to another, this change is called a handoff. The new AP is the AP that the MN changes its attachment point to. This AP can also be called the target AP, as it is the target of the handoff process. The old AP is the AP from which the MN switches to the new AP. This AP can also be called the previous AP. The serving AP is the AP that the MN is currently attached to.

The GW has a security association with all the APs (SA1, SA2, SA3) as shown in FIG. 1. These security associations (SA) can be used to encrypt and protect the integrity of data packets to preserve confidentiality of the information between the AP and the GW. Both the MN and the GW have a common Key Root (KR). Usually the KR is formed as a result of an authentication protocol run between the MN and an Authentication Server (AS) that may reside in the Internet or in the GW. This authentication protocol run that is (for example EAP [10]) is out of the scope of this invention and is not described in further detail. Here it is just assumed that the KR has been established. Privacy must be preserved for the MN in such a way that it does not reveal its permanent identity in plain text over the wireless interface. The KR could be used to protect the identity exchange after it has been established, but before that other protection mechanisms must be used, e.g., using public key cryptography to encrypt the permanent identity or using temporary identities. This need not be discussed any further herein.

B. Session Keys

FIG. 2 shows a simplified key hierarchy, where long-term credentials are used to derive a KR based on an authentication signaling. The KR is used to derive SKs for the sessions between a MN and an AP. The SK is a shared secret between the MN and the AP that currently communicates with the MN. The SK is used to create fresh ciphering keys that protect the packets on the wireless link between MN and the respective AP. SK derivation is a process in which a Key Derivation Function (KDF) is used to create new keys from existing keying material. The KDF is typically based on a one-way hash function. An example of the SK derivation function is given below. The assumption here is that the KR is fresh and nonces are not used because the system must be able to derive the keys based on the existing information. Ciphering (session) key derivation would additionally include nonces into the KDF.

$$SK_{MNx\text{-}APi} = KDF\{KR\|ID_{APi}\|TID_{MNx}\|\text{"AP Key"}\} \quad (1)$$

Where

| | |
|---|---|
| i = | index (AP number) |
| $SK_{MNx\text{-}APi}$ = | Session Key between $AP_i$ and $MN_x$ |
| KDF = | Key Derivation Function |
| KR = | Key Root |
| $ID_{APi}$ = | Public Identity of the APi |
| $TID_{MNx}$ = | Access network specific $MN_x$ identifier |
| "AP Key" = | Constant string |

From a security perspective there exists a threat that an AP may have been compromised. A compromised AP is called rogue-AP. To mitigate the threat of a rogue-AP a requirement for SK management has been created [1]. The requirement is that the MN has cryptographically separate SKs with each and every AP it is communicating with on the wireless link. This means that when the MN moves for example from AP1 to AP2, it must change the SK it had with AP1 to a new SK with AP2. Cryptographically separate or independent SKs means that an AP must not be able to derive an SK that was used or will be used in some other AP. Based on the reference architecture and the KR between MN and GW it is assumed that the MN is able to derive AP specific SKs based on the information that the AP is advertising on the access link. At a high level, the KDF is fed with the KR key and AP identity information and the result is a session key that is bound to the AP's identity. This mechanism is called channel binding. The MN needs to know the AP identity to derive the AP specific session key. This typically happens during the handoff. The MN needs to send its identity to the AP, so that AP is able to find the correct key.

Schemes in which the same SKs are transferred from one AP to another must be rejected, because they do not fulfill the security requirement of separated SKs. Key derivation mechanisms between APs and the MN that use public key (asymmetric) cryptography, like AP certificates, fulfill the requirement of SK independence, but typically require heavier computation than symmetric key cryptography (shared secrets). Handoffs are time critical and thus asymmetric cryptography is something that is not considered any further herein for SK creation between MN and an AP.

C. Handoff Considerations with Separate Session Keys

It is possible to derive the target AP specific session key before the handoff if the MN knows the target AP's identity (material needed for the key derivation). This way the key derivation process does not add to the handoff time. On the other hand executing a hash function of a few bytes is very fast. If MN buffers encrypted upstream data and handoff occurs, the new AP is not able to decrypt the upstream packets encrypted for the old AP. This means that the MN must discard the encrypted upstream packets in the buffer and re-encrypt the same packets with the new AP specific SKs. This can however be problematic if there is no other buffer of plain text packets available anymore. In the worst case an upper protocol layer must be informed that the packets were lost. Discarding encrypted upstream packets and re-encrypting them adds to the handoff delay. This problem arises also in uplink soft handovers, where the MN concurrently sends uplink packets to two APs. To overcome this problem the upper-layer must either buffer upstream data without encryption or encrypt them with both old and new AP SKs.

The MN cannot derive an AP specific SK before it gets the AP identity. On the other hand, deriving keys beforehand is not possible if real data protection keys need to be further derived from the AP specific SK based on communication between the MN and the target AP (for example nonce exchanges). In other words, deriving ciphering keys beforehand is not possible if communication between the MN and the target AP is needed, for example nonces exchange. This method to create fresh protection keys is in many cases required to provide replay protection. With separate SKs per AP this threat of replay attack is limited to the scope of a single AP with the same SK. If a fresh nonce can be transferred to the MN together with the AP identity, then the MN has all the required external information to derive SK based protection keys. The MN itself can choose a fresh and random nonce and send it along with the first upstream message to the AP. Now, the only problem is that the new AP can't send encrypted data to the MN without first getting the nonce from it. To overcome this problem, the MN can send its own fresh nonce before the handoff to the network, which then must deliver the nonce to the MN's target AP. This can happen for example during a context transfer from the current AP to the target AP.

Next are described three existing solutions for preserving cryptographically separate SKs for APs serving MNs, first (1) pre-distribution, then (2) key-request and finally (3) pre-authentication.

III. Session Management Mechanisms

This section describes three existing proposals for wireless mobile networks that require separate SKs for each AP. In Kerberos [15] the MN or client uses tickets to authenticate to servers and services. This description concentrates on methods that do not require the MN to carry and transfer keys for the APs.

A. Predistribution

In a pre-distribution [4][8], [17] scheme, as shown in FIG. 3, the GW derives AP specific SKs and distributes them to a number of APs when the MN has successfully attached to the access network. Channel-binding mechanisms are used in AP specific key derivation as described in the section II.A. above describing the Reference Architecture.

The benefit of this approach is that when the MN moves from one AP to another the new AP already has a session key for the MN because it was pre-distributed. This way the AP doesn't have to fetch the key or derive the key, but it needs to find a correct key from its key database (memory). To find a correct key AP needs to know the corresponding identity of the MN. This means that the MN's identity must be communicated to the AP before it is able to find the correct key and prepare the communication channel further. Another drawback is that the MN may never move under an AP that has a session key ready for it. This means that the APs are reserving memory resources even if they never need them. Pre-distribution may happen only for selection of APs near the MN. For this reason if the MN moves out of the pre-distribution area, new keys must be distributed from the GW.

In a rogue-AP situation, in which an attacker has gained access to an AP, it is possible for the attacker to know how many MNs are active in the area or even identify the MNs based on the key names used.

B. Key-Request

In a key-request scenario, such as shown in FIG. 4, the GW is contacted in every handoff. GW acts as an on-request Key Distribution Center (KDC) and delivers an AP specific session derived from the KR. When the MN moves from AP1 to AP2, the MN does a fast re-authentication with the GW through AP2. As a result the AP2 and the MN have a new AP2 and MN specific session key.

This scenario provides just in time, separate and fresh SKs for every AP, but the key derivation and signaling with the GW adds to the handoff delay (break).

C. Pre-Authentication

In a pre-authentication scenario [17], such as shown in FIG. 5, the MN authenticates with multiple APs through a single AP [17], [18], [20]. This way the MN has pre-established SKs with multiple neighboring APs.

When the MN moves from AP1 to AP2 or AP3 the pre-established session key is used. This makes the handoffs very fast since no signaling between AP and GW is needed. Also signaling between new and old APs is unnecessary. When doing pre-authentication, the AS and GW are heavily loaded. The high probability that the MN does not visit all the APs makes this scenario less efficient.

DISCLOSURE OF INVENTION

An object of the present invention is to provide faster, more efficient handoffs with situations that require fresh and separate session keys and ciphering keys for network elements and user mobile notes, e.g., equipment.

Fresh session/ciphering keys establishment between two peers requires nonce exchanges between the peers. When the nonces are exchanged during the handoff, critical signaling of the session key cannot be created before the handoff. The problem is how to create the session key before the peers can signal to each other.

According to a first aspect of the invention, a method comprises receiving a handover command from a source access node containing a target access point identifier and a source access point nonce, and sending a handover confirm message to said source access node containing a mobile node nonce so that said source access point can send said source access point nonce and said mobile node nonce to said target access point during a handover of said mobile node from said source access point to said target access point.

According to a second aspect of the invention, an apparatus comprises a receiver, responsive to a handover command from a source access node containing a target access point identifier and a source access point nonce and a transmitter, for providing a handover confirm message to said source access node containing a mobile node nonce so that said source access point can send said source access point nonce and said mobile node nonce to said target access point during a handover of said mobile node from said source access point to said target access point.

According to a third aspect of the invention, an access point for communicating with a mobile node in a communication network comprising a plurality of access points, said access point comprises a memory for storing a data structure including separate session keys for each of said plurality of access points for communicating with said mobile node, each session key based on a separate security association between a gateway interfaced to each access point of said plurality of access points and a device for exchanging said data structure by: (a) sending, when said correspondent is acting as a source access point, said data structure from said memory to a target access point before a handover of said mobile node from said source access point to said target access point, or (b) receiving, when said access point is acting as a target access point, said data structure for storage in said memory before a handover of said mobile node from a source access point to said target access point.

According to a fourth aspect of the present invention, a system comprises a plurality of access points for communicating with a mobile node in said system, each access point comprising: a memory for storing a data structure including separate session keys for each of said plurality of access points for communicating with said mobile node, each session key based on a separate security association between a gateway interfaced to each access point of said plurality of access points; and a device for exchanging said data structure by (a) sending, when said correspondent is acting as a source access point, said data structure from said memory to a target access point before a handover of said mobile node from said source access point to said target access point, and (b) receiving, when said access point is acting as a target access point, said data structure for storage in said memory before a handover of said mobile node from a source access point to said target access point; and a mobile node, comprising a receiver, responsive to a handover command from a source access node containing a target access point identifier and a source access point nonce, a transmitter, for providing a handover confirm message to said source access node containing a mobile node nonce so that said source access point can send said source access point nonce and said mobile node nonce to said target access point during a handover of said mobile node from said source access point to said target access point.

According to a fifth aspect of the invention, an apparatus comprises: means for receiving a handover command from a source access node containing a target access point identifier and a source access point nonce, and means for sending a handover confirm message to said source access node containing a mobile node nonce so that said source access point can send said source access point nonce and said mobile node nonce to said target access point during a handover of said mobile node from said source access point to said target access point.

According to a sixth aspect of the invention, a data structure is taught for use in carrying out an exchange of information between a first access point and a second access point in a wireless communication network, said first access point in wireless communication with a mobile node, said data structure for at least temporary storage in computer-readable media resident in said first access point and in said second access point during transfer of said data structure over an interface between said first access point and said second access point and before handover of said mobile node from said first access point to said second access point, said data structure including separate session keys for said first access point and said second access point for communicating with said mobile node, each session key based on a separate security association between the respective access point and a gateway interfaced to both said first access point and said second access point.

According to a seventh aspect of the present invention, a device is provided having means for at least temporarily storing a data structure for transmission or reception, wherein said data structure is according to the sixth aspect of the present invention.

According to an eighth aspect of the present invention, a system is provided having at least one network element able to communicate with at least one other device, wherein a communication protocol is used between the at least one other device and the network element with a data structure according to the sixth aspect of the present invention.

According to a ninth aspect of the present invention, when preparing for handoff in the originating/previous/source/old Base Station (BS)/Access Point (AP), nonces that are used to create the Session Key are exchanged with the target/new BS/AP. The previous BS/AP sends the selected access network and UE nonces to the target BS/AP along with context transfer signaling. In this application a novel secure session keys context (SKC) approach is disclosed, which utilizes a context transfer protocol [14], [3] between APs.

An access point can send an access network specific nonce in a System Information message or in a Handover Command message. The mobile node can send its nonce in a Measurement Report message or in a Handover Confirm message. Better choices may be the Handover Command and Handover Confirm (unicast) messages.

Another option, but with degraded performance, would be to let the mobile node send its nonce to the target access point when it attaches to it. In that way, the mobile node can derive the key beforehand, but not the access point.

Advantageously, the target access point is able to create ciphering keys before the mobile node attaches to it.

Because of this, the signaling between the target access point and the mobile node can be integrity protected right away or even encrypted.

The invention speeds up the handover process.

Prior to said exchange of information, said mobile node may have exchanged nonces with said first access point. In addition to said nonces, other information may be exchanged between said mobile node and said first access point, said second access point, or both, including information needed by said mobile node for encryption algorithms used for exchanging encrypted information with said second access point. The session keys may be encrypted. The session keys may include access point identity information. An encrypted session key and identity information may be signed using said security association between said gateway and said access point. Each access point receiving said data structure may be able to find its own encrypted session key therein, based on its identity.

The data structure may be structured as follows:
$HMAC_{SA-AP1}\{ID_{MNx}\|$
$HMAC_{SA-AP1}\{ID_{AP1}\|E_{SA-AP1}\{SK_{MNx-AP1}\}\|$
$HMAC_{SA-AP2}\{ID_{AP2}\|E_{SA-AP2}\{SK_{MNx-AP2}\}\|$
$HMAC_{SA-AP3}\{ID_{AP3}\|E_{SA-AP3}\{SK_{MNx-AP3}\}\}$
where each row in the data structure contains access point specific session key encrypted for a specific access point and mobile node identity with an associated identity, where the data structure is a message authentication code between the gateway and each access point of said three access points and used to protect a transfer from the gateway to each access point, and where a given row is integrity protected with said message authentication code created based on the security association between the specific access point and the gateway.

These and other objects, features and advantages of the present invention will become more apparent in light of the following detailed description of a best mode embodiment thereof, as illustrated in the accompanying drawing.

DETAILED DESCRIPTION OF THE INVENTION

IV. Session Keys Context

Context transfer is a mechanism to transfer MN specific session data from one node to another. The context transfer requires a protocol, for example the Context Transfer Protocol (CTP) [14], currently being defined in the IETF. It is designed to be used between Access Routers during handoffs [3]. Session context could contain for example header compression state, QoS settings, filtering rules, and an accounting counter, etc. IEEE has also defined a signaling protocol between Access Points [9]. WiMAX Forum is also specifying a protocol between Base Stations (=APs). An assumption in this specification is that context transfers are possible between Access Points either by using IETF CTP, IEEE 802.11F or something else. The assumption is that a context gets transferred from an old AP to a new AP in one or more packets. This can happen either proactively (old AP pushes the context to the new AP) or reactively (new AP pulls the context from the old AP) depending on which AP, old or new, initiates the context transfer. Context transfer happens proactively if the context is transferred to the target AP before the MN starts signaling with the target AP. Reactive context transfer happens when the MN initiates the transfer through the target AP (reactive handoff). It is assumed that proactive handoffs are much more common than reactive handoffs. Typically, reactive handoffs happen if the MN's radio connection breaks unexpectedly.

A. Session Keys Context Transfer

Figure 1:
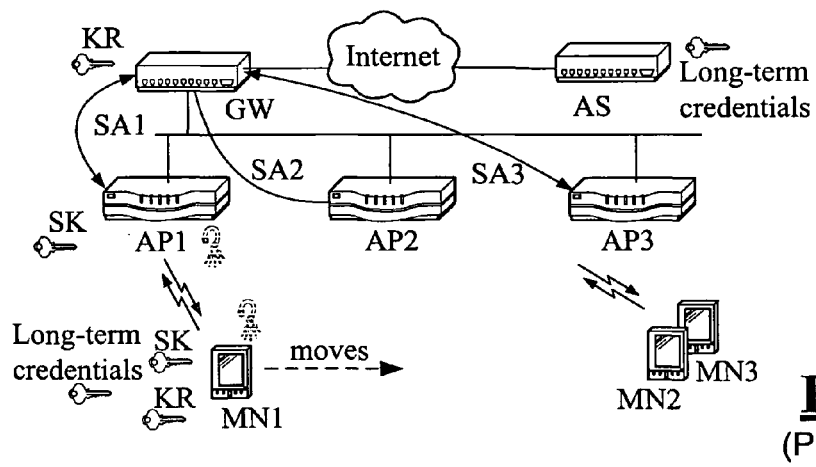
FIG. 1 shows a prior art reference architecture.
Figure 2:
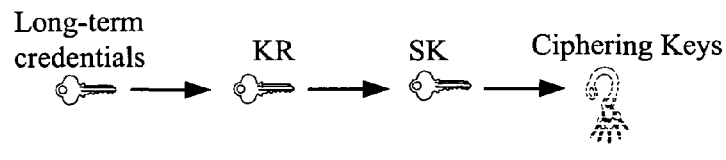
FIG. 2 shows a simplified prior art key hierarchy.
Figure 3:
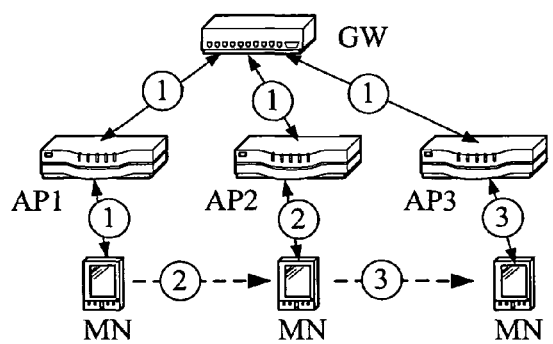
FIG. 3 shows a prior art key-distribution scenario.
Figure 4:
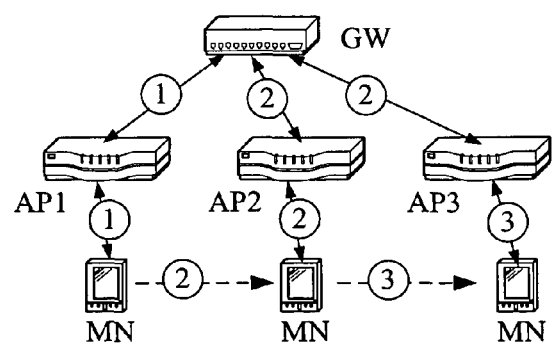
FIG. 4 shows a prior art key request scenario.
Figure 5:
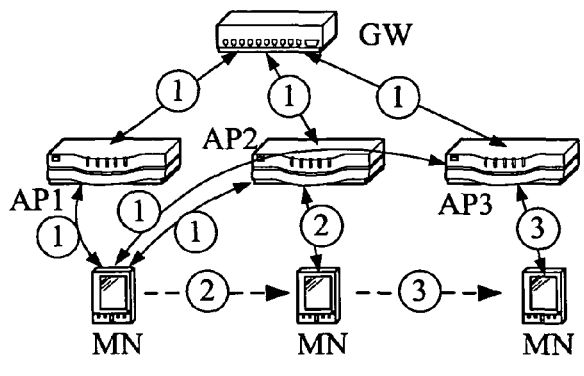
FIG. 5 shows a prior art pre-authentication scenario.
Figure 6:
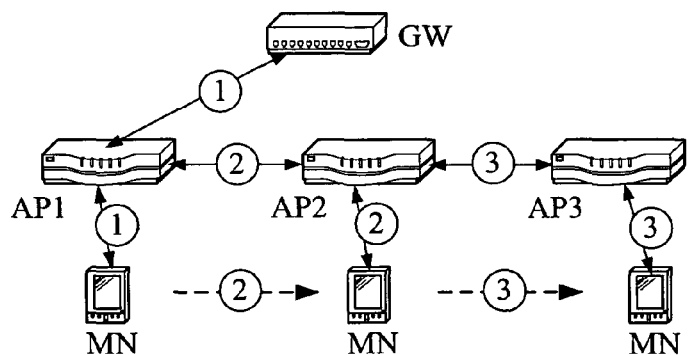
FIG. 6 shows a session key context scenario, according to the present invention.

FIG. 6 shows steps similar to those shown in other approaches described above. First (step 1), the MN authenticates to the GW, which delivers a session key context to the AP1. This SKC is used to create ciphering keys between the AP1 and the MN for data integrity protection and optionally encryption. When the MN moves under the AP2, SKC transfer happens between AP1 and AP2. The MN establishes fresh ciphering keys, optionally based on the pre-exchanged nonces, and other information needed for the ciphering algorithms with AP2 (step 2). Similarly, when the MN moves under AP3, SKC is transferred from AP2 to AP3 (step 3). As described earlier, the nonce exchange could happen before the actual handoff to the target AP. This way the handshake time is reduced considerably.

The SKC contains derived SKs secured for each AP separately based on the SAs between the GW and the APs. Each AP has a separate SA with the GW. The SKs are encrypted and accompanied with AP identity information. The encrypted session key and AP identity information are signed using a SA between GW and AP. Each AP that receives this context finds its own encrypted session key based on its identity. Below is an example SKC for three APs.

$HMAC_{SA-AP1}\{ID_{MNx}\|$
   $HMAC_{SA-AP1}\{ID_{AP1}\|E_{SA-AP1}\{SK_{MNx-AP1}\}\|$
   $HMAC_{SA-AP2}\{ID_{AP2}\|E_{SA-AP2}\{SK_{MNx-AP2}\}\|$
   $HMAC_{SA-AP3}\{ID_{AP3}\|E_{SA-AP3}\{SK_{MNx-AP3}\}\}$

Here $HMAC_{SA-APi}$ is a Message Authentication Code calculated over the data and a shared secret [11] between the GW and $AP_i$. It is used to protect the whole structure for the initial transfer from GW to the AP1. Also the context is accompanied with the $MN_x$'s identity. Each row in the SKC contains AP specific SK encrypted for the specific AP and its identity ($E_{SA-APi}$). The whole row is integrity protected with a HMAC created based on the SA between the specific AP and GW ($HMAC_{SA-APi}$).

Figure 7:
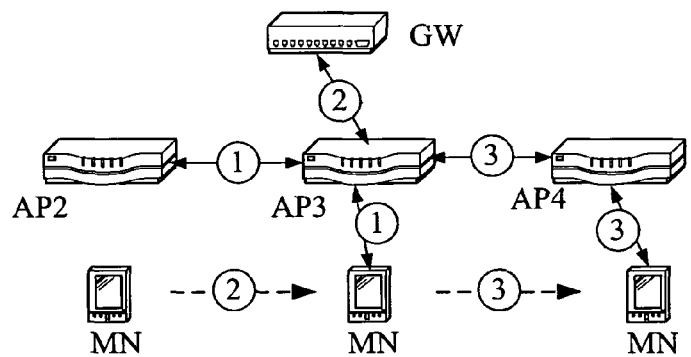
FIG. 7 shows a Session Keys Context update, according to the present invention.

If the SKC doesn't have a row for the neighboring AP, then the current AP can request an update to the current session key context or a completely new one. Step 3 in FIG. 7 highlights this scenario, where AP3 notices that the SKC doesn't have a row for AP4 and requests a context update from GW (step 2). When MN moves from AP3 to AP4, both the original context and the updated context are transferred from AP3 to AP4 in one SKC.

Below is illustrated the combined SKC rows (for AP1, AP2, AP3, and AP4). Here it is assumed that the AP keeps the MN specific context information in one structure. This allows the combination of rows from different SKCs transferred from the GW (i.e. the integrity protection is for GW to AP transfer only).

$HMAC_{SA-AP1}\{ID_{AP1}\|E_{SA-AP1}\{SK_{MNx-AP1}\}\}$
$HMAC_{SA-AP2}\{ID_{AP2}\|E_{SA-AP2}\{SK_{MNx-AP2}\}\}$
$HMAC_{SA-AP3}\{ID_{AP3}\|E_{SA-AP3}\{SK_{MNx-AP3}\}\}$
$HMAC_{SA-AP4}\{ID_{AP4}\|E_{SA-AP4}\{SK_{MNx-AP4}\}\}$

Figure 8:
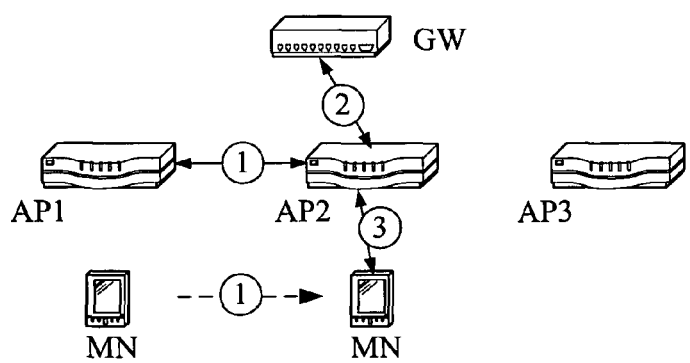
FIG. 8 shows Session Keys Context update request during handoff, according to the present invention.

If for some reason the received SKC in the new AP doesn't contain a row for this AP, then this AP needs to request an SKC update from the GW. This is illustrated in FIG. 8 (step 2). This adds to the delay of the handoff, since the AP cannot directly go to the step 3 in the figure, but request an SKC update and wait for the reply. This case however should be an error case, since the AP1 in the figure should have noticed that the context doesn't contain a row for the AP2.

Figure 9:
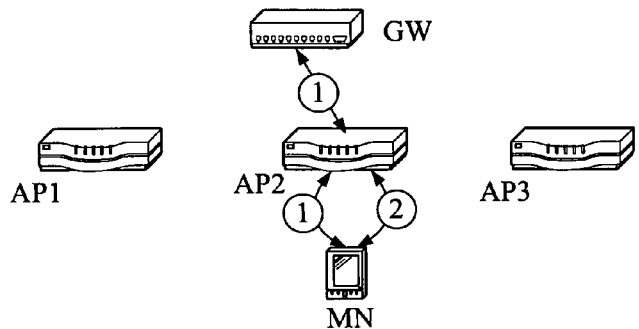
FIG. 9 shows Re-authentication and a new session key context retrieval from GW, according to the present invention.

The SKs as the session itself have a lifetime. This means that the SKC cannot be used after the session lifetime has expired. The MN does a re-authentication procedure with the GW to refresh the session and to request a new set of keys (FIG. 9). The re-authentication procedure happens before the session expires to enable a smooth transition to the new SKC. When the MN's current AP (AP2 in FIG. 9) gets a new SKC, the old context is discarded and the new context is taken into use by negotiating new SKs between MN and AP2.

B. Arguments for the Security Provided by the Invention

Figure 10:
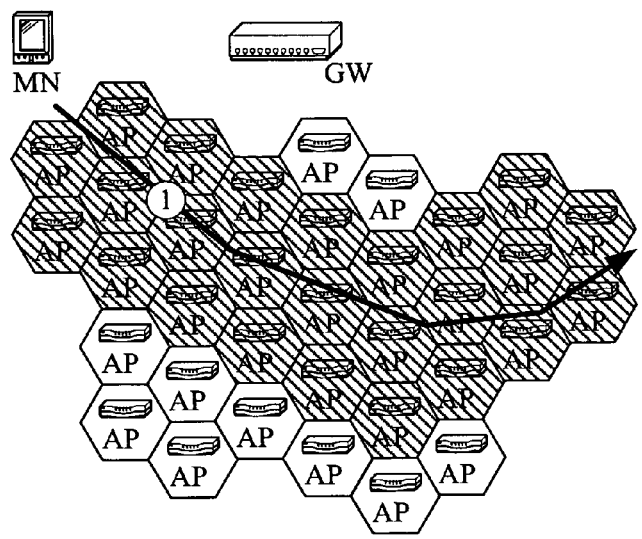
FIG. 10 shows an example of an MN traversal path and highlighted APs included into the context, according to the present invention.

The GW may act as a Key Distribution Center and produce cryptographically separate SKs for each AP. In such a case, the GW needs to know the network topology of the APs to be able to create an SKC that covers the area within which the MN is currently located. For example it could maintain a neighbor AP list for each AP. This, however, represents a separate problem of how to optimize the SKC material with different APs included and is not particularly pertinent to the present invention and is therefore not discussed in any great detail here. However, for example, the GW could collect information of MN traversal patterns and create SKCs that contain the most common paths that the MN takes. FIG. 10 contains an imaginary example of an AP structure. The APs that are in grey are included into the SKC. The path that the MN takes can for example be a street in a city.

Figure 11:
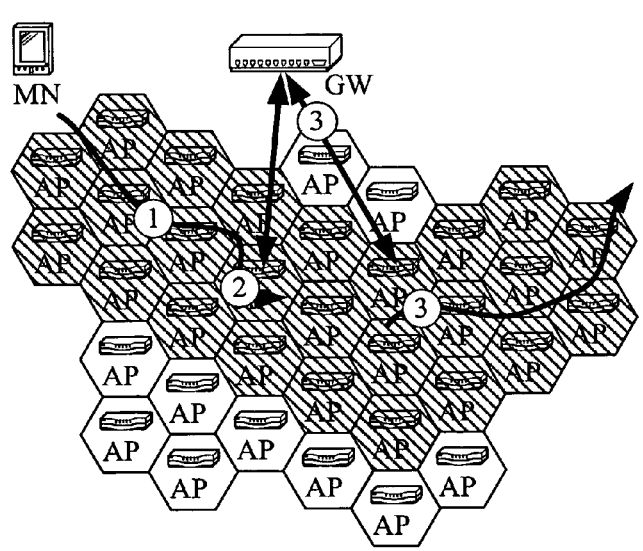
FIG. 11 shows Context transfer through the GW, according to the present invention.

In case the MN doesn't update its location to the network (paging), but remains idle and at the same time mobile, it is possible that the MN skips multiple APs in a route (see FIG. 11). When the MN again becomes active it can do a full re-authentication to the network and get a new SKC relating to its current AP. However, if the existing SKC is still valid, then it may not be necessary to create a new one. FIG. 11 illustrates a case where the MN moves (step 1) and then becomes idle (step 2) and then active again (step 3). When the MN knows that it has an existing session with the access network it can attach to an AP and request network access service. If the MN informs the current AP about the previous AP it had visited, then the current AP is able to fetch the SKC from the previous AP via the GW or fetch a new SKC depending on which one is more suitable. It is out of the scope of the present invention to distinguish these cases further.

Presented below is a list of advantages and disadvantages of the SKC approach.

Advantages (a) Cryptographically separate SKs between APs without the need for synchronously and in real-time communicating with the KDC during the handoff(s).
(b) No need to do asymmetric cryptographical operations to create cryptographically separate SKs.
(c) More scalable system, because GW is not involved during the handoff process. No strict real-time requirements for the GW.
(d) Load on GW independent of AP-AP handover frequency.
(e) Load on GW independent of number of APs in the network.
(f) APs only need to keep SKC objects for the MN's they are serving currently. Unused objects can be removed. Thus, AP resources are dependent only on the number of concurrent MNs an AP is serving at any moment.
(g) If the SKC grows too big for a single AP to handle it can cut the rows from the SKC structure (for example keys that are not in its neighbor list).
(h) MN does not have to send the SKs to the APs. MN does not have to know the APs included in the SKC. Space requirement in the MN is not bound to the number of APs because the SKs ($SK_{APi}$) are derived from the Root Key (RK)
(i) Implicit AP authentication (via KDC) without the need to have AP specific certificates. If the AP is able decrypt message with the proper SK, then the AP is validated.
(j) No need to distribute SKs for APs beforehand. AP gets the SK from the SKC.
(k) The SKC construction allows the context to be sent in multiple separate packets. The old AP knows ($ID_{APi}$) the entry in the SKC structure that contains the SK for the target AP. Old AP can send this entry first to the target AP together with other high priority context data.
(l) The SKC scenario can use all the available memory in the APs to reduce signaling load in the GW.

Disadvantages (a) Session context memory requirement in AP. This is a minor disadvantage, since the keys are small (for example 128 bits).
(b) GW needs to know for which APs it will create the SKs. However, the GW may also optimize the contents of the SKC to include APs that are more commonly used.
(c) Integrity protected or encrypted packets in the MN's buffer need to be discarded when AP changes (new keys). This is valid for all the approaches described in this application.
(d) Integrity protected or encrypted packets on the MN's current AP cannot be used as-is in the MN's new AP. The previous AP must transfer packets decrypted.
(e) An interface between APs is needed for the context transfers.

Memory Requirements

The total amount of memory required in an AP depends on the number of concurrent and active MNs attached to it (number of SKCs), the single SKC size, the number of APs included in one SKC. The SKC size depends on the size of the HMAC, key, and the AP ID. Thus, the amount of memory required in one AP can be calculated with formula (2).

$$M = nSK_{MAX} * nMN_{MAX} * (\text{sizeof}(HMAC) + \text{sizeof}(SK) + \text{sizeof}(ID_{APi})) \quad (2)$$

Where

| | |
|---|---|
| M = | Required Memory in AP for SKs contexts in bytes. |
| $nSK_{MAX}$ = | Number of SKs at maximum in one SKs context |
| $nMN_{MAX}$ = | Number of concurrent and active MNs at maximum attached to a single AP |
| sizeof(x) = | function that returns the x size in bytes |

This function returns only the memory requirement for the rows in the SKCs. Additional protection fields are needed when the context is transferred from the GW to the AP and MN's identity is needed.

Below is one row from the SKC. If it is specified that the HMAC is 160 bits (SHA-1 for example) long, key size 128 bits and AP ID size 128 bits, then this row is 416 bits (encryption does not change the length of the SK).

$HMAC_{SA-APi}\{ID_{APi}\|E_{SA-APi}\{SK_{MN-APi}\}\}$

Figure 12:
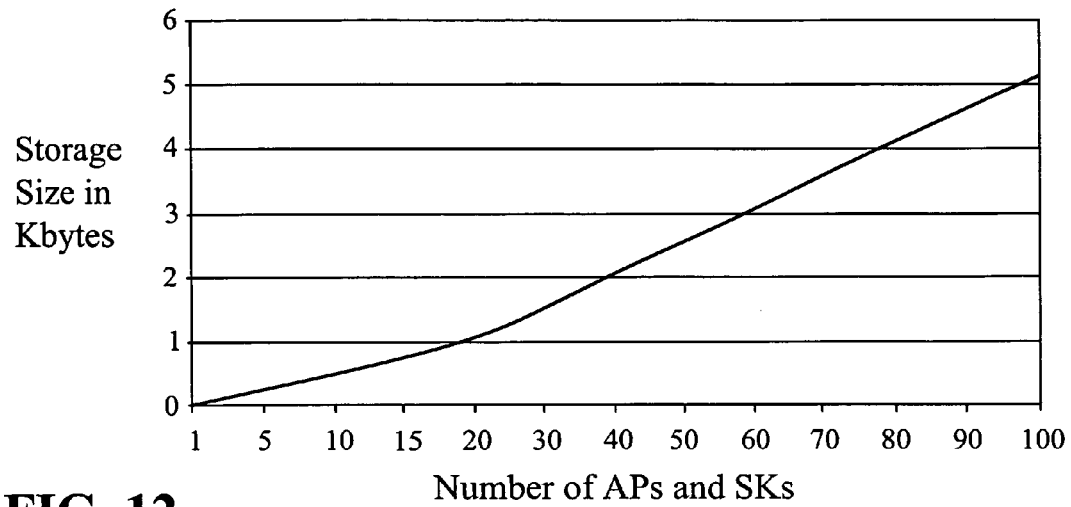
FIG. 12 shows the Number of SKs/APs (X-axis) context storage size (Y-axis) with one MN (Kbytes), according to the present invention.

FIG. 12 shows how much memory is required for one MN's SKC when the number of APs included in the context increases. For 20 APs, the SKC size is about 1 KB.

Figure 13:
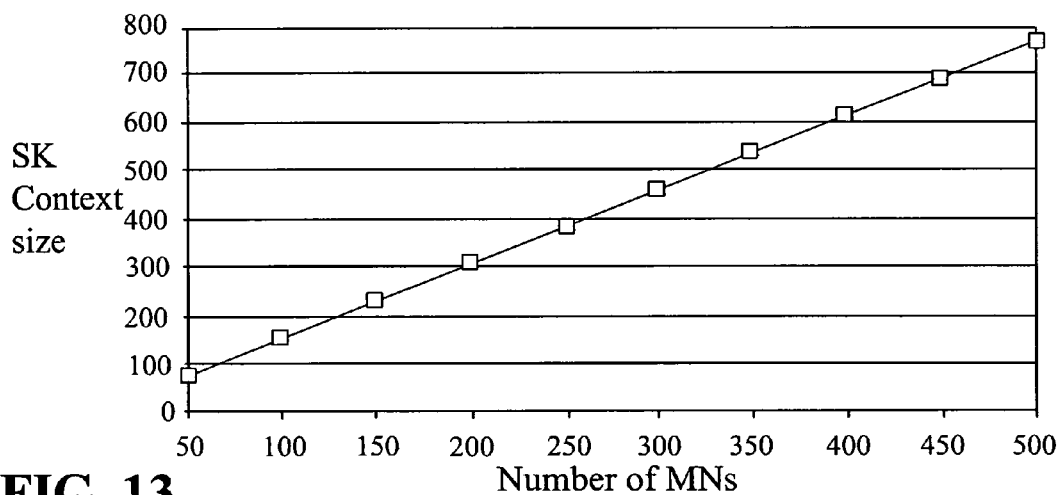
FIG. 13 shows Session keys context storage size (Y-axis) for 30 APs (Kbytes) versus multiple MNs (X-axis), according to the present invention.

FIG. 13 shows the memory requirements (Y-axis) for one AP with multiple concurrent and active MNs (X-axis) attached to it. The figure assumes that the number of APs included in the SKC is 30. As can be seen from the figure, the function is linearly growing.

Figure 14B:
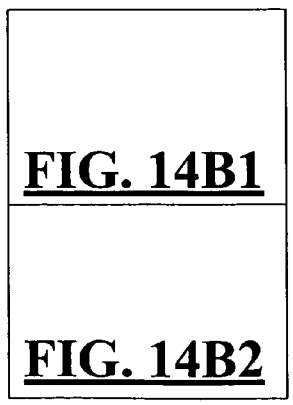
FIGS. 14A and 14B (viewed using FIGS. 14B1 and 14B2) show top-level and detailed proactive exchange of secure session keys context.
Figure 15B:
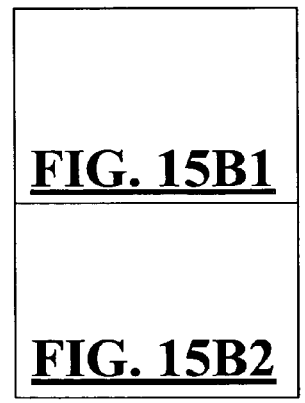
FIGS. 15A and 15B (viewed using FIGS. 15B1 and 15B2) show top-level and detailed proactive exchange of secure session keys context.
Figure 15A:
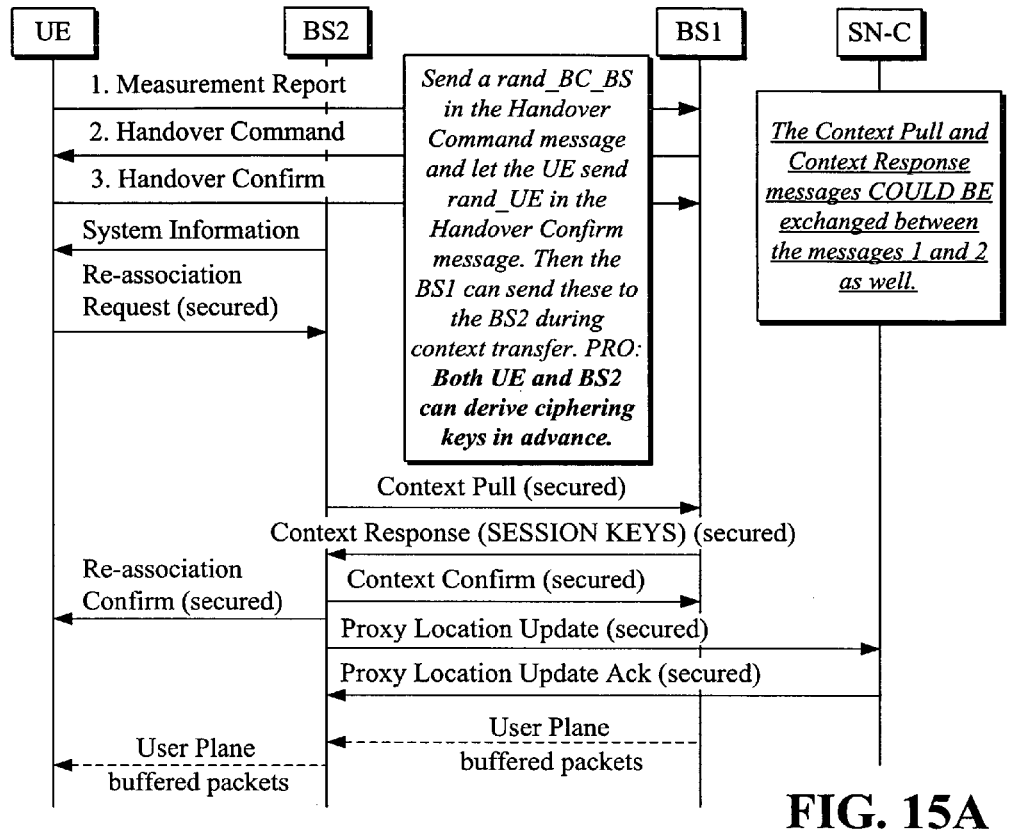
Figure 14A:
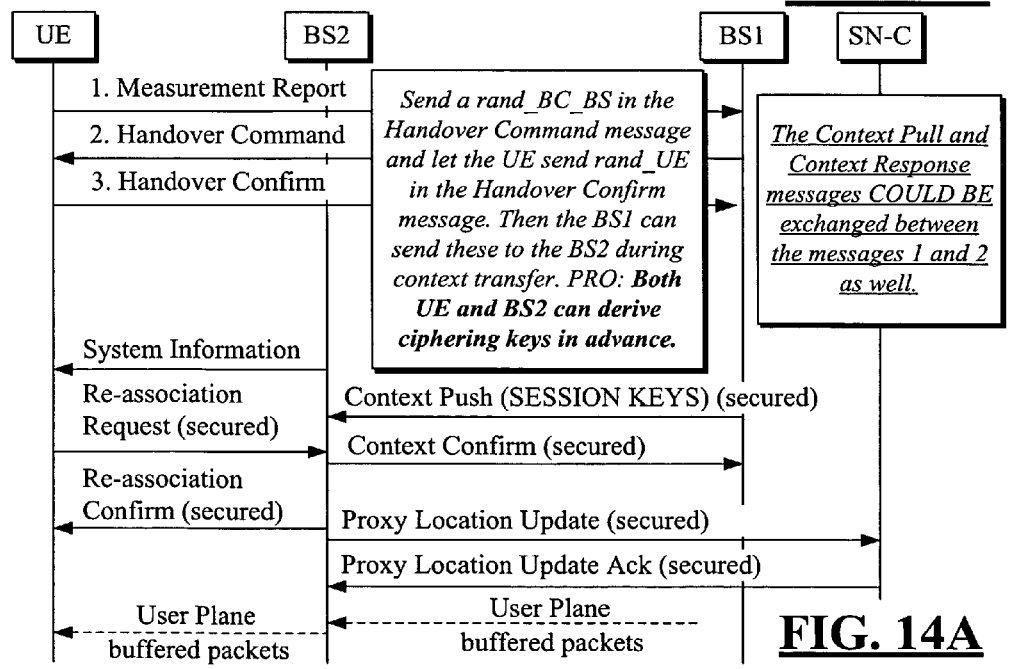

FIGS. 14A and 15A are high level diagrams of respective illustrative proactive and reactive scenarios of pre-exchanged nonces, according to the present invention. More detailed illustrations of each are shown in FIGS. 14B and 15B, respectively. Each figure shows three messages in the beginning: Measurement Report, Handover Command, and Handover Confirm messages. The System Information message is a message that is periodically broadcast by the access point. These details will now be explained below.

Proactive (FIGS. 14A and 14B):
1. UE sends Measurement report to its current BS.
2. BS1 sends handover command based on the input from the UE.
3. UE sends handover confirm. This should be integrity protected.
4. UE receives System Information message from the BS2. This BS is the target of the UE's handover. This message contains: rand_BC, Oper id, BS2_ID, PA_ID, Cell_ID, PubKey-ID, signatureCert. Rand_BC is used for replay protection if it is not provided by lower layers. It is also used for the key derivation (freshness). Rand_BC should change often enough.
5. In proactive context transfer mode, the previous BS pushes the context to the target BS. This context is signed and encrypted. Context_ID_BS1 is not encrypted because the target BS can then map this context to the message that the UE sends. The BS1_BS2_rand_A is a nonce that BS1 has sent to the BS2 before in a Context Confirm message (7). But if this is a first message from BS1 to BS2 then this nonce is omitted.
6. UE sends a re-association request. UE signs the message with the SK with the previous BS. UE attaches the context id that identifies the UE's context in the previous BS. UE's ciphering algorithm capabilities are also included in the message. UE encrypts its temporary id (UE_TID) with the SK with the previous BS. Finally UE adds paging area ID and target BS id and previous BS ids. When the target BS gets this message it checks that the rand_BC is fresh and that the BS ids are valid. Then it forwards the message to the previous BS (see step 6 shown in the reactive handover case of FIG. 15B). The target BS also selects the ciphering algorithms based on UE_SecCap (see UEA and UIA in 3G). A mechanism (not shown) can also be provided to differentiate reactive and proactive handovers. Also, if the target BS has not received the Context Push message->it could send a Context Pull message.
7. Context confirm message. Context_ID_BS1 is signed for message authentication purposes. BS2 also sends a BS1_BS2_rand_B, which the BS1 must add to the next context push message.
8. Re-Association confirm message. This message is signed with the newly derived ciphering key and the context id and new RLID are encrypted. Target BS also sends the selected ciphering algorithms information and the information that the UE sent earlier in step 6, to confirm that the received information was valid (no man-in-the-middle).
9. Proxy location update. The target BS sends proxy location update message to the SN-C to update the UE's current BS location. This message includes the signed contents from UE in step 5 (the same as in step 5). This way the SN-C is able to authenticate UE's message and also the proxy location update (it derives previous BS SK based on the rand_BS_BS1 and rand_UE. I.e. the BS is not able to spoof the location update message. NOTE: This message is not handover critical, but could be sent after message 7 if needed.
10. Proxy location update acknowledgement.

Buffered packets from previous BS are then transferred to the target BS.

Reactive (FIGS. 15A and 15B):
1. UE sends Measurement report to its current BS.
2. BS1 sends handover command based on the input from the UE.
3. UE sends handover confirm.
4. UE receives System Information message from the BS2. This BS is the target of the UE's handover. This message contains rand_BC, Oper id, BS2_ID, PA_ID, Cell_ID, PubKey_ID, signatureCert. Rand_BC is used for replay protection if it is not provided by lower layers. It is also used for the key derivation (freshness). Rand_BC should change often enough.
5. UE sends a re-associate request. This message contains: SignSK_UE_BS2{rand_BC, SignSK_UE_BS1{rand_UE, Context_ID_BS1, UE_SecCap, EncryptSK_UE_SecCap, EncryptSK_UE_BS1{UE_TID}, PA_ID, BS2_ID, BS1_ID}}. UE signs the message with the SK with the previous BS. UE attaches the context id that identifies the UE's context in the previous BS. UE's ciphering algorithm capabilities are also included in the message. UE encrypts its temporary id (UE_TID) with the SK with the previous BS. Finally UE adds paging area ID and target BS id and previous BS ids. When the target BS gets this message it checks that the rand_BC is fresh and that the BS ids are valid. Then it forwards the message to the previous BS (reactive handover case). The target BS also selects the ciphering algorithms based on UE_Sec Cap (see UEA and UIA in 3G).
6. Target BS sends context transfer request to the previous BS. This message contains the signed message from the UE. When previous BS gets this message it finds the right session keys context based on the plain text Context_ID_BS1 and uses the SK from it to verify the received message.

7. Then the BS collects RAN contexts and transfers them to the target BS. If multiple messages are needed, previous BS sends first the target BS specific entry from the session keys context. This message is protected with pair-wise session context transfer protection keys. When target BS gets the context it finds the entry for itself and decrypts the contents. It also derives ciphering keys based on the target BS specific SK. Based on this derived cipher key it verifies the UE's signature (step 5). The BS1_BS2_rand_A is a nonce that BS2 received from BS1 earlier (replay protection) (see message 8).
8. Target BS sends context confirm message to the previous BS. Previous BS can then release the resources for this UE (free the memory taken by the session keys context). BS2 sends a nonce to the BS1 for replay protection reasons (BS1_BS2_rand_B).
9. Target BS sends re-association confirm message to the UE. This message is signed with the newly derived ciphering key and the context id and new RLID are encrypted. Target BS also sends the selected ciphering algorithms information and the information that the UE sent earlier in step 5, to confirm that the received information was valid (no man-in-the-middle).
10. The target BS sends proxy location update message to the SN-C to update the UE's current BS location. This message includes the signed contents from UE in step 5 (the same as in step 6). This way the SN-C is able to authenticate UE's message and also the proxy location update (it derives previous BS SK based on the rand_BS_BS1 and rand_UE). I.e. the BS is not able to spoof the location update message. NOTE: This message is not handover critical, but could be sent after message 7 if needed.
11. Proxy location update acknowledgement.
12. Buffered packets are delivered from the previous BS to the target BS.

Figure 16:
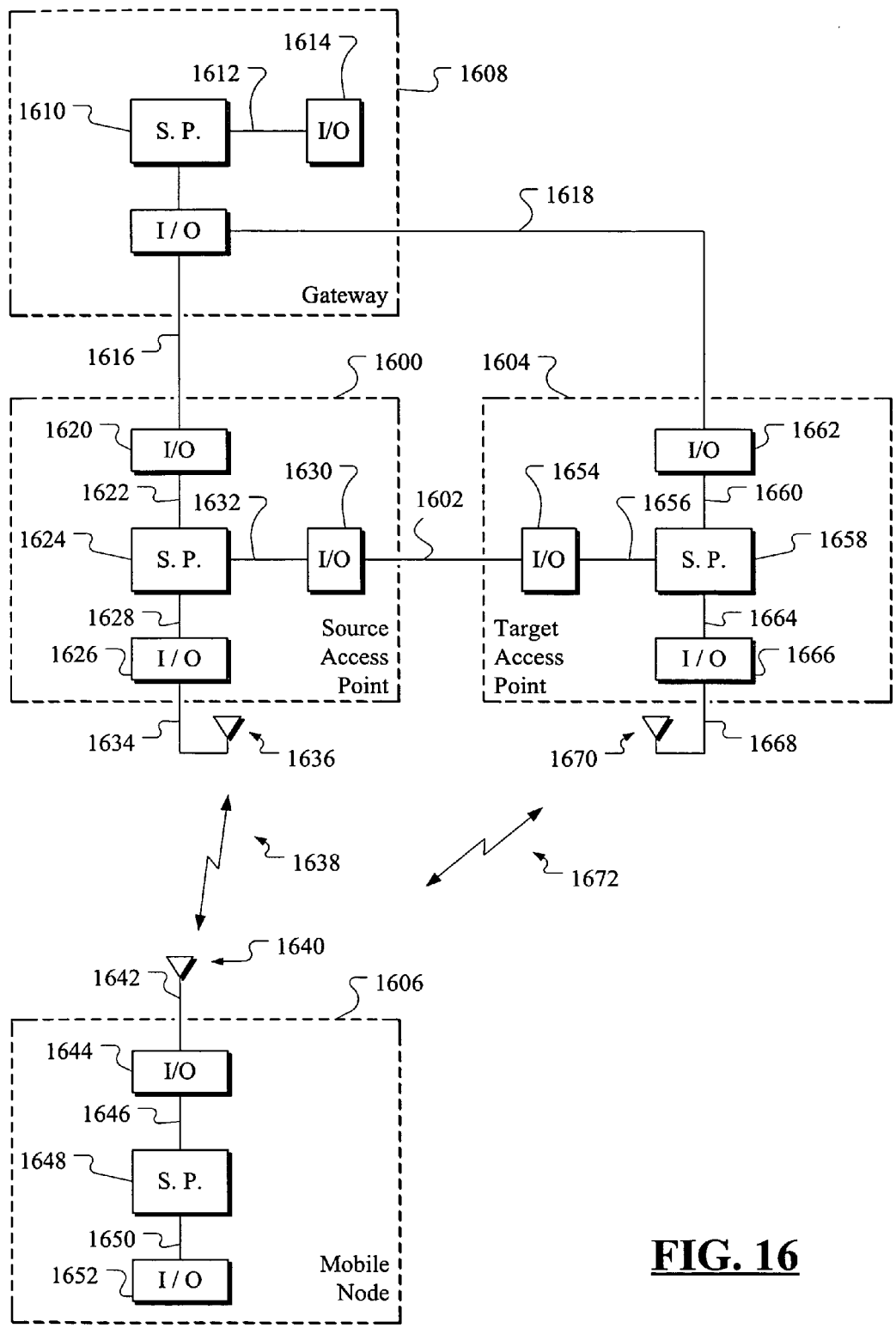
FIG. 16 shows a system, according to the present invention.

Referring now to FIG. 16, a system is shown, according to the present invention, having a number of network elements in combination. A source access point 1600 is shown connected by a signal line 1602 to a target access point 1604. Although only two access points are shown, other access points may also be included in a grouping of such access points. For instance, a number of access points in the geographical vicinity of a mobile node 1606 may be included in a grouping of such access points all interconnected together and also connected to a gateway 1608. Each of the network elements shown in FIG. 16 show a signal processor and one or more input/output devices. The gateway 1608 includes a signal processor 1610 connected on a line 1612 to an input/output device 1614 which may in turn may be connected to an authentication server that may reside on the internet or nearby the gateway or even in the gateway. The gateway 1608 is shown connected to both the source access point on a line 1616 and to the target access point 1604 on a line 1618. The security associations for each access point may be provided by the gateway on the connection lines 1616 and 1618.

The source access point 1600 is shown having an input/output device 1620 connected by a line 1622 to a signal processor 1624. The signal processor 1624 is shown connected to an input/output device 1626 by a line 1628 and to an input/output device 1630 by a line 1632. The input/output device 1626 is shown connected by a signal line 1634 to an antenna 1636 which communicates over a radio link 1638 with the mobile node 1606. An antenna 1640 is connected by a signal line 1642 to an input/output device 1644 of the mobile node 1606. The input/output device 1644 is connected by a line 1646 to a signal processor 1648 of the mobile node 1646. The signal processor 1648 may also be connected by a signal line 1650 to another input/output device 1652 which may be connected for instance to a user interface for allowing a user of the mobile node to input information and to receive information.

The target access point 1604 is shown including an input/output device 1654 connected by the line 1602 to the input/output device 1630 of the source access point 1600. This connection, according to the invention, allows the direct communication of either the context pull or context push messages described previously in connection with FIGS. 14A, 14B, 15A, and 15B. It also permits the communication of the context response message, the context confirm message and the user plane buffered packets from the source access point to the target access point once the context confirmation message is sent from the target access point to the source access point.

The input/output device 1644 of the mobile node 1606 is able to act as a receiver in response to the handover command from the source access node 1600 transmitted over the wireless link 1638. As described previously, such a handover command from the source access node contains, according to the present invention, both a target access point identifier and a source access point nonce. The signal processor receives the signaling from the source access point and responds with a handover confirm message to the source access node 1600 containing a mobile node nonce so that the source access point can send the source access point nonce and the mobile node nonce to the target access point 1604 during a handover of the mobile node 1606 from the source access point to the target access point.

The input/output device 1644 is also responsive to a system information message from the target access point 1604 sent over the wireless link 1672 containing the target access point identifier and a target access point nonce. After receipt, this information is transferred by the input/output device 1644 on the line 1646 to the signal processor 1648 where it is processed. For instance, a random number may be generated and a session key associated with the target access point derived based on the information sent from the both the source access point and the target access point. The signal processor then provides a re-association request message on the line 1646 back to the input/output device 1644 which in turn transmits the re-association request message on the line 1642 to the antenna 1640 where it is transmitted on the radio link 1672 back to the target access point antenna 1670. The target access point receives the re-association request message on the line 1668 and provides it via the input/output device 1666 over the line 1664 to the signal processor 1658. If a context push has already taken place as described previously in connection with FIGS. 14A and 14B, the signal processor 1658 will make the necessary preparations to send the context confirm message back to the source access point 1600. If a context push has not taken place, the signal processor 1658 will carry out the steps necessary in preparation for sending a context pull message on the line 1602 to the source access point 1600 according to the methodology previously described in connection with 15A and 15B. In either event, assuming the single processor 1658 has received the proper context transfer information from the source access point 1600 on the line 1602, the target access point will then make the preparations necessary to send the context confirm message back to the source access point on the line 1602. The source access point will then close the interface to the mobile node and release mobile node resources, i.e., it will free memory taken by the session key or keys context.

The target access point will assign a new radio link id, store the mobile node radio access network and related contexts and create a context id corresponding to the target access point. A reassociation confirm message will then be sent by the target access point over the radio link 1672 to the mobile node 1606 and a proxy location update message will be sent for example from the target access point on the line 1618 back to the gateway. The gateway will acknowledge the proxy location update and the source access point 1600 will then transfer the buffered packets associated with the previous session to the target access point on the line 1602 for processing by the signal processor 1658. The signal processor 1658 will then be in a position to transfer the buffered packets to the mobile node 1606 if needed.

Figure 17:
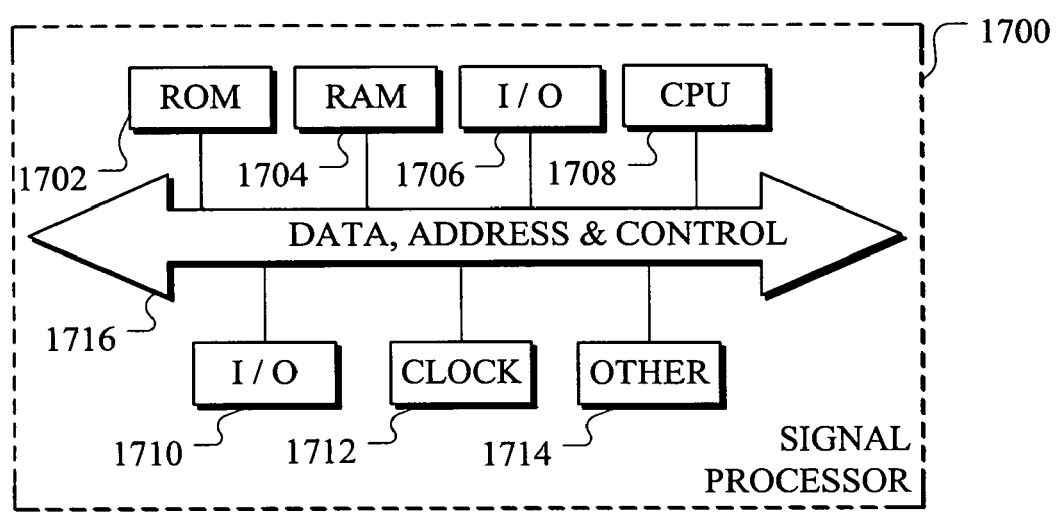
FIG. 17 shows a non-limiting example of a signal processor which may be used in any one or more of the network entities shown in FIG. 16.

FIG. 17 shows a non-limiting example of a signal processor 1700 which may be used in one or more of the network elements shown in FIG. 16. The illustrated signal processor comprises a general purpose signal processor having a read-only memory 1702, a random access memory 1704, an input/output device 1706, a central processing unit 1708, another input/output device 1710, a clock 1712, and many other devices shown generally at reference numeral 1714, all interconnected by data, address and control lines 1716. As will be appreciated by any person skilled in the art, programming code stored in the read only memory 1702 written according to a selected programming language will be used by the central processing unit 1708 to execute program steps to carry out the various functions described previously. The random access memory 1704 may be used to store intermediate results of computations carried out by the central processing unit 1708 and the various input/output devices 1706, 1710 may be used to communicate with other network elements as described in detail in for instance FIG. 16. The signal processor 1700 may of course take other forms such as a digital signal processor, an application specific integrated circuit, discrete components, and other forms of hardware and firmware in any combination.

V. Comparison

In this section, a brief comparison of the three prior art proposals to the inventive SKC approach is made.

Comparison with Pre-Distribution

In pre-distribution the keys are distributed to APs and the MN may visit the APs or not. Similarly according to the inventor in SKC the keys are bundled into a data structure and sent to the MN's current AP but the MN may not visit all the APs. In the pre-distribution scheme the APs are involved in signaling with the GW every time a new MN attaches to the area of the APs. This means that the APs need more control signaling capacity and state information than in the invention approach. More signaling capacity is needed from the GW as well. In the invention approach the required memory is per AP not for all APs, but the overall memory consumption difference is not big. The pre-distribution scheme is fast from the handoff point of view, since the key is already located in the target AP. However, the AP needs to find the correct key and needs an identifier from the MN before this can happen. In the invention approach, if the context transfer happens proactively the target AP can prepare itself before the MN really attaches to it.

An advantage over the pre-distribution scheme is that a possible rogue-AP does not know which MNs are around. In the pre-distribution scheme all the APs (in the active set) know all the MNs or at least a number of MN's attached to the access network. In the re-distribution scheme the GW must know for which APs to send the keys and when to send more keys if the GW did not send the keys to all the existing APs under its control. The tradeoff is between memory consumption and signaling load. The inventive SKC scenario can use all the available memory to reduce signaling load.

Pros
  Less signaling between GW and AP
  Rogue-AP doesn't know which MNs (or how many) are around before the MN attaches to it.
  AP is unnecessarily not involved before MN attaches to it.
Cons
  Requires context transfers between APs
  Comparison with Key-Request The key-request method requires synchronized signaling with the GW during the handoffs, which makes the scheme potentially slower than for example the inventive proactive SKC transfer. On the other hand no inter-AP interface is needed. Especially if the inter-AP interface is not available due to physical transport topology or protocol reasons, the key-request mechanism could be considered roughly as fast as context transfer through the GW. Key-request requires control plane signaling with the GW, but context transfer may not need that. The key-request method does not require as much memory from the APs as our approach. In the key-request method the keys can be derived on-request and thus the key is fresh and it has full lifetime after handover. The key-request scheme does not require as much memory from the AP as the inventive approach. Thus, the key-request method is memory optimized but at the cost of signaling load.

Pros
  No need to do handoff critical synchronized signaling between AP and GW.
  Less signaling between GW and AP
  Mobility and scalability optimized with the same security level.
Cons
  Requires context transfers between APs
  Requires more memory in the AP.
  Comparison with Pre-Authentication Pre-authentication has the same advantages over the GW-AP signaling load as the inventive approach, but requires more signaling from the MN. If handover decisions happen very fast it may be possible that the MN has not pre-authenticated to the target AP. To fix this issue the MN would have to pre-authenticate with all the neighboring APs. This makes the pre-authentication scheme less efficient from the signaling point of view. Also the neighboring APs need to reserve memory for the keys, even if the MN never attaches to all of the APs.

Pros
  Less signaling between GW, AS and AP
  Mobility optimized with the same security level.
Cons
  Requires context transfers between APs.
  Requires more memory in the AP.

CONCLUSION

The present invention is a novel SKC scheme that mitigates rogue-AP threat with cryptographically separate SKs for every AP. Supportive evidence been provided showing the better scalability over the other existing proposals, namely the key-request, pre-authentication, and pre-distribution schemes without losing their security and mobility optimization properties. Also the APs only get the SKs when they really need them. This just-in-time provisioning means trustworthiness and security checks can be done as close to the time of use of any keys as possible. Also described is a way to transfer nonces between the MN and the AP before handoff for fresh ciphering key creation that reduces the overall handoff latency.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

ABBREVIATIONS

| | |
|---|---|
| AK = | Authentication Key |
| MN = | Mobile Node |
| AP = | Access Point |
| ACK = | Authentication Keys Context |
| GW = | Gateway |
| SA = | Security Association |
| KR = | Key Root |
| AS = | Authentication Server |
| EAP = | Extensible Authentication Protocol (RFC 3748) |
| KDF = | Key Derivation Function |
| KDC = | Key Distribution Center |
| CTP = | Context Transfer Protocol |
| MAC = | Message Authentication Code (RFC 2104) |
| MAC SA-AP = | MAC calculated over data and shared secret between GW & AP |
| PANA = | Protocol for Carrying Authentication for Network Access |
| SK = | Session Key |
| SKC = | Session Keys Context |

REFERENCES

[1] Housley, R., "AAA Key Management," work in progress IETF Internet Draft, draft-housley-aaa.key-mgmt-00.txt, June 2005.

[2] Aboba, B., Simon, D., Arkko, J., Eronen, P. and H. Levkowetz, "Extensible Authentication Protocol (EAP) Key Management Framework", draft-ietf-eap-keying-06.txt, Internet draft (work in progress), April 2005.

[3] R. Koodli and C. Perkins, Fast Handovers and Context transfers in Mobile Networks, ACM SIGCOMM Computer Communication Review, vol. 31, October 2001.

[4] Arbaugh, W. and B. Aboba, "Handoff Extension to RADIUS", draft-irtf-aaaarch-handoff-04 (work in progress), October 2003. ("pre-emptive key distribution")

[5] Mishra, A., Shin, M., Arbaugh, W., Lee, I. and K. Jang, "Proactive Key Distribution to support fast and secure roaming", IEEE 802.11 Working Group, IEEE-03-084r1-I, http://www.ieee802.org/11/Documents/DocumentHolder/3-084.zip, January 2003.

[6] A. Mishra, M. Shin, and W. A. Arbaugh, "Pro-active Key Distribution using Neighbor Graphs," IEEE Wireless Communications Magazine, February 2004.

[7] S. Pack and Y. Choi, "Fast Inter-AP Handoff using Predictive-Authentication Scheme in a Public Wireless LAN," IEEE Networks 2002, August 2002.

[8] S. Pack and Y. Choi, "Pre-Authenticated Fast Handoff in a Public Wireless LAN based on IEEE 802.1x Model," IFIP TC6 Personal Wireless Communications 2002, October 2002.

[9] Institute of Electrical and Electronics Engineers, "Recommended Practice for Multi-Vendor Access Point Interoperability via an Inter-Access Point Protocol Across Distribution Systems Supporting IEEE 802.11 Operation", IEEE 802.11F, July 2003.

[10] Aboba, B., Blunk, L., Vollbrecht, J., Carlson, J. and H. Lefkowetz, "Extensible Authentication Protocol (EAP)", RFC 3748, June 2004.

[11] Krawczyk, H., Bellare, M. and R. Canetti, "HMAC: Keyed-Hashing for Message Authentication", RFC 2104, February 1997.

[12] D. Forsberg, Y. Ohba, B. Patil, H. Tschofenig, A. Yegin, "Protocol for Carrying Authentication for Network Access (PANA)", Work in progress, IETF Internet-Draft, draft-ietf-pana-pana-08.txt, May 2005.

[13] D. Forsberg, Y. Ohba, B. Patil, H. Tschofenig, A. Yegin, "PANA Mobility Optimizations", Work in progress, IETF Internet-Draft draft-ietf-pana-mobopts-00.txt, January 2005.

[14] J. Loughney, M. Nakhjiri, C. Perkins, R. Koodli, "Context Transfer Protocol", Work in progress, IETF Internet-Draft, draft-ietf-seamoby-ctp-11.txt, August 2004.

[15] J. Kempf, Ed. "Problem Description: Reasons For Performing Context Transfers Between Nodes in an IP Access Network", September, IETF RFC3374.

[16] J. Steiner, C. Neuman, and J. I. Schiller, "Kerberos: An Authentication Service for Open Network Systems," in Proc. Winter USENIX Conference, Dallas (1988).

[17] K. Hoeper and G. Gong, "Models of Authentication in Ad Hoc Networks and Their Related Network Properties", Technical Report, Department of Electrical and Computer Engineering University of Waterloo. CACR 2004-03.

[18] D. Balfanz, D. K. Smetters, P. Stewart, C. Wong, "Talking To Strangers: Authentication in Ad-Hoc Wireless Networks", Proceedings of the Network and Distributed System Security Symposium 2002 conference.

[19] Institute of Electrical and Electronics Engineers, 802.21-04/xxxr1, "802.11r: Transition Acceleration Protocol (TAP)" proposal. November 2004.

[20] Institute of Electrical and Electronics Engineers, 802.21-04/xxxr1, "802.11r: JustInTime Reassociation (JIT)" proposal. November 2004.

The invention claimed is:

1. Method comprising:

receiving a handover command from a source access point containing a target access point identifier and a source access point nonce, sending a handover confirm message to said source access point containing a mobile node nonce so that said source access point sends said source access point nonce and said mobile node nonce to said target access point along with a session key context during a handover of said mobile node from said source access point to said target access point wherein said session key context contains session keys secured for both said source access point and said target access point separately based on security associations between a gateway and the source access point and said target access point, receiving a system information message from said target access point containing said target access point identifier and a target access point nonce, sending a re-association request message to said target access point encrypted using a mobile node nonce as well as both said source access point nonce and said target access point nonce, receiving a re-association confirm message from said target access point encrypted using both said target access point nonce and said mobile node nonce, and receiving user plane buffered packets from said source access point via said target access point.

2. The method of claim 1, further comprising:

choosing said mobile node nonce, and deriving a session key based on said target access point nonce for use in signing said re-association request message.

3. The method of claim 2, further comprising:
signing said re-association request message also using a previously derived session key associated with said source access point.

4. The method of claim 1, wherein said re-association request message includes a context identifier associated with said target access point.

5. Apparatus comprising:
at least one processor; and
at least one memory including computer program code, the at least one memory and the computer program code configured to with the at least one processor, cause the apparatus at least to:
receive a handover command from a source access point containing a target access point identifier and a source access point nonce;
transmit a handover confirm message to said source access point containing a mobile node nonce so that said source access point sends said source access point nonce and said mobile node nonce to said target access point along with a session key context during a handover of said mobile node from said source access point to said target access point wherein said session key context contains session keys secured for both said source access point and said target access point separately based on security associations between a gateway and the source access point and said target access point;
receive a system information message from said target access point containing said target access point identifier and a target access point nonce;
transmit a re-association request message to said target access point encrypted using a mobile node nonce as well as both said source access point nonce and said target access point nonce;
receive a re-association confirm message from said target access point encrypted using both said target access point nonce and said mobile node nonce; and
receive user plane buffered packets from said source access point via said target access point.

6. The apparatus of claim 5, further comprising a signal processor for selecting said mobile node nonce, and for deriving a session key based on said target access point nonce for use in signing said re-association request message.

7. The apparatus of claim 6, wherein said signal processor is also for signing said re-association request message also using a previously derived session key associated with said source access point.

8. The apparatus of claim 5, wherein said re-association request message includes a context identifier associated with said target access point.

9. Apparatus, comprising:
at least one processor; and
at least one memory including computer program code, the at least one memory and the computer program code configured to with the at least one processor, cause the apparatus at least to:
store in the at least one memory a data structure including separate session keys for each of a plurality of access points in a communication network for communicating with a mobile node in the communication network, each session key based on a separate security association between a gateway in the communication network and each access point of said plurality of access points; and
exchange said data structure by (A) sending, when said access point is acting as a source access point, said data structure from said at least one memory to a target access point before a handover of said mobile node from said source access point to said target access point, and (B) when said access point is acting as a target access point, (1) receive said data structure for said storage in said at least one memory before a handover of said mobile node from a source access point to said target access point wherein prior to said sending or receiving said data structure, said mobile node has provided a nonce to said source access point that is exchanged along with said data structure, (2) during a handover send a system information message containing a target access point identifier and a target access point nonce to the mobile node, (3) receive a re-association request message from the mobile node encrypted using the mobile node nonce as well as both the source access point nonce and the target access point nonce, (4) send a re-association confirm message to the mobile node encrypted using both the target access point nonce and the mobile node nonce, and (5) send user plane buffered packets to the mobile node.

10. The access point of claim 9, where in in addition to said nonce, other information is exchanged between said mobile node and said source access point, said target access point, or both, including information needed by said mobile node for encryption algorithms used for exchanging encrypted information with said target access point.

11. The access point of claim 9, wherein the session keys are encrypted.

12. The access point of claim 11, wherein the session keys include access point identity information.

13. The access point of claim 12, wherein the encrypted session key and identity information are signed using said security association between said gateway and said access point.

14. The access point of claim 13, wherein said target access point receiving said data structure is able to find it's own encrypted session key based on its identity.

15. The access point of claim 14, wherein said data structure has a structure as follows for said plurality of access points comprising three access points:
$HMAC_{SA-AP1}\{ID_{MNx}\|$
$HMAC_{SA-AP1}\{ID_{AP1}\|E_{SA-AP1}\{SK_{MNx-AP1}\}\|$
$HMAC_{SA-AP2}\{ID_{AP2}\|E_{SA-AP2}\{SK_{MNx-AP2}\}\|$
$HMAC_{SA-AP3}\{ID_{AP3}\|E_{SA-AP3}\{SK_{MNx-AP3}\}\}$
where each row in the data structure contains an access point specific session key encrypted for a specific access point and mobile node identity.

16. The access point of claim 9, wherein said data structure has a structure as follows for said plurality of access points comprising three access points:
$HMAC_{SA-AP1}\{ID_{MNx}\|$
$HMAC_{SA-AP1}\{ID_{AP1}\|E_{SA-AP1}\{SK_{MNx-AP1}\}\|$
$HMAC_{SA-AP2}\{ID_{AP2}\|E_{SA-AP2}\{SK_{MNx-AP2}\}\|$
$HMAC_{SA-AP3}\{ID_{AP3}\|E_{SA-AP3}\{SK_{MNx-AP3}\}\}$
where each row in the data structure contains an access point specific session key encrypted for a specific access point and mobile node identity.

17. The access point of claim 9, wherein said data structure includes a context identifier.

* * * * *